Figure 1:
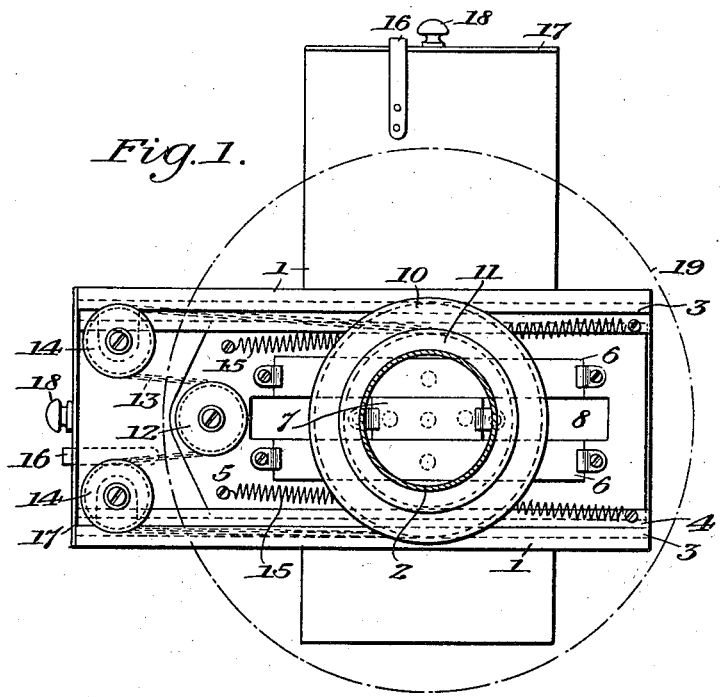

J. H. SUTCLIFFE.
OPHTHALMOMETER AND CERATOMETER.
APPLICATION FILED JUNE 21, 1913.

1,142,778.

Patented June 8, 1915.
2 SHEETS—SHEET 1.

J. H. SUTCLIFFE.
OPHTHALMOMETER AND CERATOMETER.
APPLICATION FILED JUNE 21, 1913.
1,142,778.
Patented June 8, 1915.
2 SHEETS—SHEET 2.
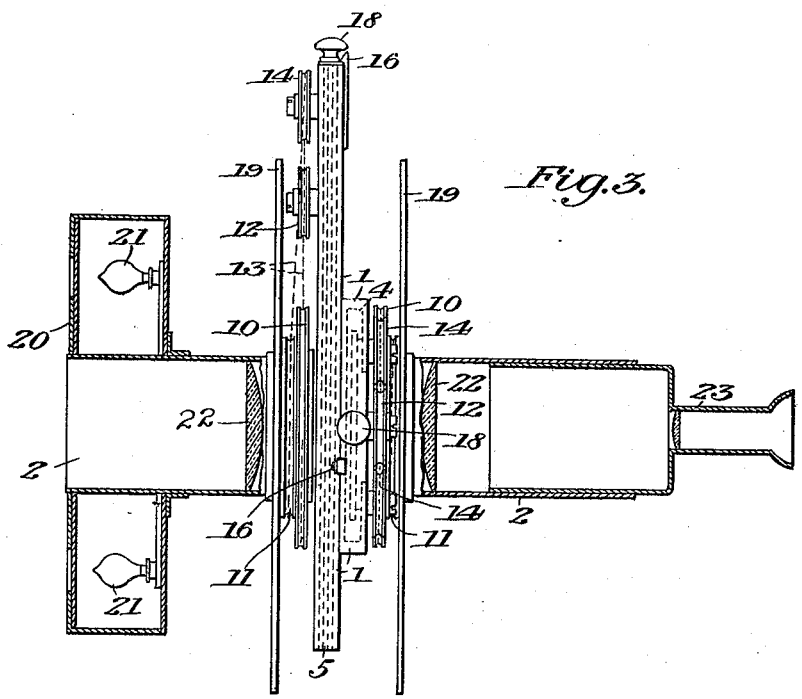
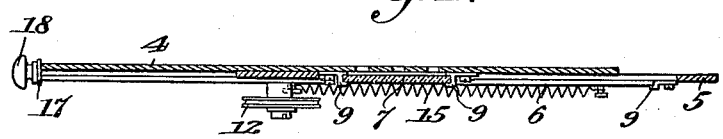

UNITED STATES PATENT OFFICE.

JOHN HAMER SUTCLIFFE, OF LONDON, ENGLAND, ASSIGNOR TO GEORGE CULVER LTD., OF LONDON, ENGLAND.

OPHTHALMOMETER AND CERATOMETER.

1,142,778.  Specification of Letters Patent.  Patented June 8, 1915.

Application filed June 21, 1913. Serial No. 775,032.

*To all whom it may concern:*

Be it known that I, JOHN HAMER SUTCLIFFE, a subject of the King of Great Britain and Ireland, residing at 199 Piccadilly, London, W., Great Britain, have invented certain new and useful Improvements in Ophthalmometers and Ceratometers, of which the following is a specification, reference being had therein to the accompanying drawings.

In ophthalmometers or ceratometers of the type wherein that portion of the optical system by means of which the doubling or multiplying of the reflection of the mire is effected, consists of glasses that are adjustable relatively to each other for the purpose of bringing the double or multiple images into contact or coincidence, this doubling or multiplying portion has heretofore been connected with its operating mechanism, or other members of the system, in such manner that, in order to inspect, clean, repair, remove for optical purposes, or renew the doubling or multiplying portion, it has been necessary to disconnect mechanical connections such as springs or to remove from the instrument and to take apart the entire optical system; such disconnection, removal and separation of parts involving considerable trouble and risk of injury.

Now this invention has for its object to obviate these inconveniences, and according thereto in an instrument of the type described, the doubling or multiplying portion of the optical system is so mounted that it can be inserted or withdrawn by sliding or otherwise without the necessity of disconnecting any mechanical connection, and without interfering with other members of the optical system, while there is moreover provided for moving the doubling or multiplying portion improved mechanism so constructed and arranged as to permit of the easy insertion and withdrawal of this portion into or from the system.

According to one arrangement the doubling or multiplying portion is mounted in one or more slides, adapted to be inserted into or withdrawn from one or more guides formed in or connected with the frame of the instrument and to be actuated by the mechanism for moving the said element or elements relatively to the remainder of the system. This mechanism preferably comprises one or more devices of the kind known as a Chinese windlass. The two coaxial pulleys of the windlass or of each windlass, of different diameters, are preferably arranged concentrically with the axis of the instrument, and may conveniently be formed on a ring mounted on the telescope or carrier of the objective, while the movable pulley of the windlass is mounted on the slide. The cord or chain, as usual in a Chinese windlass is passed around the movable pulley and has its ends attached to the coaxial pulleys, and the slide is subject to the action of a spring device whereby the chain is maintained in tension. Preferably the cord or chain is first passed also around a pair of guide pulleys mounted on the frame and then around that portion of the periphery of the movable pulley which lies nearest to the coaxial pulleys; this arrangement presenting the advantage that when the slide is inserted or withdrawn, the movable pulley can simply be moved into or out of contact with the chain, which otherwise would have to be sprung into or out of its groove. An arrangement of this kind may advantageously be employed for mounting the auxiliary divided lenses of an ophthalometer or ceratometer such as described in the prior specification of United States Letters Patent No. 890580 and relatively moving the portions of each auxiliary lens in order to double the images of the mire; and the invention is hereinafter described and illustrated by way of example, as applied to the mounting of the auxiliary lenses of a ceratometer of this kind and the movement of the marginal portions of these lenses relatively to their central portions which in this example remain stationary during the doubling of the mire image.

Figure 2:
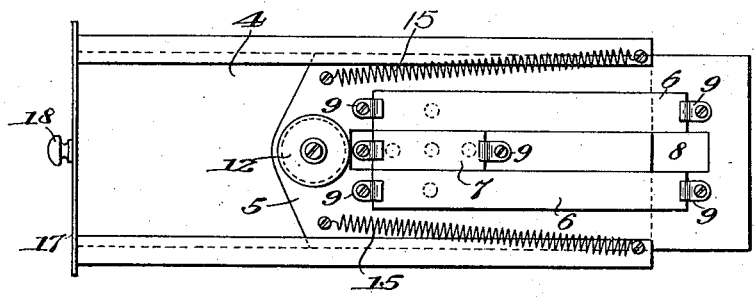

In the accompanying drawings, Figure 1 is a veiw on a plane transverse to the axis of the telescope, showing in elevation the frames that carry the slides, one of these slides with its actuating mechanism being visible; Fig. 2 is an elevation of the said slide when removed from its frame; Fig. 3 is a view on a plane parallel to the axis of the telescope; and Fig. 4 is a longitudinal section through the slide shown in Fig. 3.

The frames 1, secured at right angles to each other in the vertical and the horizontal direction transversely to the telescope 2 as shown in Fig. 1 are each provided with guides 3 for the carrier 4 of a slide 5 whereon the movable portions 6 of the corresponding auxiliary lens, which in this example are its marginal portions, are mounted, the fixed central portion 7 is attached to the carrier 4 and projects through a slot 8 in the slide. The glasses 6 and 7 are held in position so as to be easily removable by screw clips 9. The co-axial differential pulleys 10, 11 of each windlass are formed as a ring mounted on the telescope 2, while its movable pulley 12 is mounted on the slide 5. The chain 13 of the windlass is attached at its ends to the coaxial pulleys 10, 11, is carried around the movable pulley 12 on the slide and guide pulleys 14 on the frame, and is maintained in tension by springs 15 connecting the slide with its carrier. Each carrier and guide is normally maintained in position in its frame by means of a detent 16 engaging with the end plate 17 of the carrier. By the disengagement of this detent the carrier with its slide can be withdrawn through a knob 18 and again inserted as desired.

Each pair of coaxial pulleys 10, 11 is, in the arrangement illustrated, rotated to move the corresponding slide in its carrier by means of a handwheel 19.

The telescope 2 has mounted on it the mire 20, suitably illuminated, as by electric lamps 21, and is provided with the usual objective 22 and eyepiece 23 constituting the fixed portion of the optical system, through which the image of the mire formed in the corneal surface is viewed. It will be clear, that by means of the arrangements herein described the auxiliary doubling or multiplying portion 6, 7 of the optical system can be inserted into or withdrawn from the field of view of the telescope and relatively adjusted independently of said fixed portion 22 of the system.

When the carrier 4 is withdrawn from its guides 3, the pulley 12 and the chain 13 are maintained in contact with each other by the action of the springs 15, the coaxial pulleys 10, 11 being rotated to take up the slack of the chain, which thus, when the pulley 12 leaves it, stretches across from one to the other of the guide pulleys 14, ready to engage the pulley 12 on the re-insertion of the slide.

Actuating mechanism such as described can be arranged to impart various kinds of movement to the slide or slides, according to the requirements of the type of instrument to which it is applied; the two portions of the cord or chain on opposite sides of the movable pulley may for instance be parallel, to impart a uniform movement to the slide or they may be inclined to each other to impart to it a variable movement. Normally the action of the coaxial pulleys is a differential one, the chain being wound on one of them as it is unwound from the other. In this case a considerable rotation of the pulleys imparts but a small movement to the slide, which can thus be adjusted to a high degree of accuracy, varying with the difference in the circumferences of the coaxial pulleys. When, however, the coaxial pulleys have been rotated to an extent sufficient to bring both portions of the chain to the same side of the pulleys, the arrangement becomes an aggregate one, both portions of the chain being simultaneously wound on or unwound from the pulleys; and by this means, when desired, as for adjustment, a rapid movement can be imparted to the slide.

The facility with which the doubling or multiplying device can be withdrawn, enables the instrument to be easily converted into a corneal miscoscope wherein the lenses consist of the fixed elements of the optical system. The herein described improvements, by providing for interchangeability of the doubling or multiplying portion of the instrument, besides facilitating inspection and cleansing, further simplify the construction of the instrument, and consequently its cost of production and repair.

I claim:—

1. In an ophthalmometer, a mire adapted to produce a corneal image, a telescope comprising an objective, guides connected with said telescope, a carrier adapted to be inserted into or withdrawn from said guides, and an auxiliary lens system carried by said carrier.

2. In an ophthalmometer, a mire adapted to produce a corneal image, a telescope comprising an objective, guides connected with said telescope, a carrier adapted to be inserted into or withdrawn from said guides, and an auxiliary lens system carried by said carrier, a slide movably mounted in said carrier, said auxiliary system comprising two mutually adjustable lens portions, one of which is mounted on said carrier while the other is mounted on said slide, and means for mutually adjusting said lens portions.

3. In an ophthalmometer, a mire adapted to produce a corneal image, a telescope comprising an objective, guides connected with said telescope, a carrier adapted to be inserted into or withdrawn from said guides, an auxiliary lens system carried by said carrier, a slide movably mounted in said carrier, said auxiliary system comprising two mutually adjustable lens portions, one of which is mounted on said carrier while the other is mounted on said slide, and means for mutually adjusting said lens portions comprising a pulley having concentric portions of different diameters, a pulley rotatably mounted on said slide, and a flexible member that is passed around said pulley on said slide, and the ends of which are secured to the peripheries of the two concentric portions of first-mentioned pulley.

4. In an ophthalmometer, a mire adapted to produce a corneal image, a telescope comprising an objective, guides connected with said telescope, a carrier adapted to be inserted into or withdrawn from said guides, an auxiliary lens system carried by said carrier, a slide movably mounted in said carrier, said auxiliary system comprising two mutually adjustable lens portions, one of which is mounted on said carrier while the other is mounted on said slide, and means for mutually adjusting said lens portions comprising a pulley having concentric portions of different diameters, a pulley rotatably mounted on said slide, guide pulleys mounted on said guides, a flexible member that is secured at its ends to the peripheries of the two concentric portions of first-mentioned pulley, and that is passed around said guide pulleys and around said pulley on the slide, and spring connections between said slide and said carrier.

5. In an ophthalmometer, a mire adapted to produce a corneal image, a telescope comprising an objective, guides connected with said telescope, a carrier adapted to be inserted into or withdrawn from said guides, an auxiliary lens system carried by said carrier, a slide movably mounted in said carrier, said auxiliary system comprising two mutually adjustable lens portions, one of which is mounted on said carrier while the other is mounted on said slide, and means for mutually adjusting said lens portions comprising a pulley mounted coaxially on said telescope and having concentric portions of different diameters, a handwheel connected to said pulley to rotate the same, a pulley rotatably mounted on said slide and a flexible member that is passed around said pulley on said slide, and the ends of which are secured to the peripheries of the two concentric portions of first-mentioned pulley.

6. In an ophthalmometer, a mire adapted to produce a corneal image, a telescope comprising an objective, guides connected with said telescope, a carrier adapted to be inserted into or withdrawn from said guides, an auxiliary lens system carried by said carrier, a slide movably mounted in said carrier, said auxiliary system comprising two mutually adjustable lens portions, one of which is mounted on said carrier while the other is mounted on said slide, and means for mutually adjusting said lens portions comprising a pulley mounted coaxially on said telescope and having concentric portions of different diameters, a handwheel connected to said pulley to rotate the same, a pulley rotatably mounted on said slide, a flexible member that is passed around said pulley on said slide, and the ends of which are secured to the peripheries of the two concentric portions of first-mentioned pulley, and spring connections between said slide and said carrier.

7. In an ophthalmometer, a mire adapted to produce a corneal image, a telscope comprising an objective, two sets of guides connected with said telescope and arranged at right angles to each other transversely to the axis of said telescope, carriers adapted to be inserted into or withdrawn from each of said sets of guides, and an auxiliary lens system carried by each of said carriers.

8. In an ophthalmometer, a mire adapted to produce a corneal image, a telescope comprising an objective, two sets of guides connected with said telescope and arranged at right angles to each other transversely to the axis of said telescope, carriers adapted to be inserted into or withdrawn from each of said sets of guides, an auxiliary lens system carried by each of said carriers, a slide movably mounted in each carrier, said auxiliary system each comprising two mutually adjustable lens portions, one of which is mounted on said carrier while the other is mounted on said slide, and means for mutually adjusting said lens portions.

9. In an ophthalmometer, a mire adapted to produce a corneal image, a telescope comprising an objective, two sets of guides connected with said telescope and arranged at right angles to each other transversely to the axis of said telescope, carriers adapted to be inserted into or withdrawn from each of said sets of guides, an auxiliary lens system carried by each of said carriers, a slide movably mounted in each carrier, said auxiliary system each comprising two mutually adjustable lens portions, one of which is mounted on said carrier while the other is mounted on said slide, and means for mutually adjusting said lens portions comprising a pulley having concentric portions of different diameters, a pulley rotatably mounted on said slide, and a flexible member that is passed around said pulley on said slide, and the ends of which are secured to the peripheries of the two concentric portions of first-mentioned pulley.

10. In an ophthalmometer, a mire adapted to produce a corneal image, a telescope comprising an objective, two sets of guides connected with said telescope and arranged at right angles to each other transversely to the axis of said telescope, carriers adapted to be inserted into or withdrawn from each of said sets of guides, an auxiliary lens system carried by each of said carriers, said auxiliary systems each comprising two mutually adjustable lens portions one of which is mounted on said carrier while the other is mounted on said slide, and means for mutually adjusting the lens portions of each auxiliary system.

11. In an ophthalmometer, a mire adapted to produce a corneal image, a telescope comprising an objective, two sets of guides connected with said telescope and arranged at right angles to each other transversely to the axis of said telescope, carriers adapted to be inserted into or withdrawn from each of said sets of guides, an auxiliary lens system carried by each of said carriers, said auxiliary systems each comprising two mutually adjustable lens portions one of which is mounted on said carrier while the other is mounted on said slide, and means for mutually adjusting the lens portions of each auxiliary system each comprising a pulley mounted coaxially on said telescope and having concentric portions of different diameters, a hand-wheel connected to said pulley to rotate the same, a pulley rotatably mounted on said slide, and a flexible member that is passed around said pulley on said slide, and the ends of which are secured to the peripheries of the two concentric portions of first-mentioned pulley.

12. In an ophthalmometer, a mire adapted to produce a corneal image, a telescope comprising an objective, two sets of guides connected with said telescope and arranged at right angles to each other transversely to the axis of said telescope, carriers adapted to be inserted into or withdrawn from each of said sets of guides, an auxiliary lens system carried by each of said carriers, said auxiliary systems each comprising two mutually adjustable lens portions one of which is mounted on said carrier while the other is mounted on said slide, and means for mutually adjusting the lens portions of each auxiliary system, each comprising a pulley mounted coaxially on said telescope and having concentric portions of different diameters, a handwheel connected to said pulley to rotate the same, a pulley rotatably mounted on said slide, and a flexible member that is passed around said pulley on said slide, and the ends of which are secured to the peripheries of the two concentric portions of first-mentioned pulley, and spring connections between each of said slides and its carrier.

13. In an ophthalmometer, a mire adapted to produce a corneal image, a telescope comprising an objective, two sets of guides connected with said telescope and arranged at right angles to each other transversely to the axis of said telescope, carriers adapted to be inserted into or withdrawn from each of said sets of guides, an auxiliary lens system carried by each of said carriers, said auxiliary systems comprising two mutually adjustable lens portions one of which is mounted on said carrier while the other is mounted on said slide, and means for mutually adjusting the lens portions of each auxiliary system comprising a pulley mounted coaxially on said telescope and having concentric portions of different diameters, a handwheel connected to said pulley to rotate the same, a pulley rotatably mounted on said slide and a flexible member that is passed around said pulley on said slide, and the ends of which are secured to the peripheries of the two concentric portions of first-mentioned pulley.

In witness whereof I have hereunto set my hand in presence of two witnesses.

JOHN HAMER SUTCLIFFE.

Witnesses:
P. VARNALS,
T. F. PAUL.

Copies of this patent may be obtained for five cents each, by addressing the "Commissioner of Patents, Washington, D. C."